United States Patent [19]

Franz

[11] 4,245,780
[45] Jan. 20, 1981

[54] TEMPERATURE REGULATOR ASSEMBLY AND SIGNAL MODULATOR THEREFOR

[75] Inventor: Rudolph J. Franz, Schaumburg, Ill.

[73] Assignee: Eaton Corporation, Cleveland, Ohio

[21] Appl. No.: 897,604

[22] Filed: Apr. 18, 1978

[51] Int. Cl.³ .............................................. F24F 7/06
[52] U.S. Cl. ..................................... 236/13; 236/49; 236/87
[58] Field of Search ............................. 236/49, 87, 13

[56] References Cited

U.S. PATENT DOCUMENTS

| | | | |
|---|---|---|---|
| 2,868,459 | 1/1959 | Modes | 236/87 |
| 3,294,320 | 12/1966 | Franz | 236/87 |
| 3,770,195 | 11/1973 | Franz | 236/13 |
| 3,831,841 | 8/1974 | Franz | 236/13 |
| 3,861,588 | 1/1975 | Bata et al. | 236/13 |
| 3,983,930 | 10/1976 | Franz | 165/31 |
| 4,007,873 | 2/1977 | Duchek | 236/49 |
| 4,151,953 | 5/1979 | Sugiura | 236/87 |

Primary Examiner—Albert J. Makay
Assistant Examiner—William E. Tapolcai, Jr.
Attorney, Agent, or Firm—R. J. McCloskey; R. A. Johnston; E. C. Crist

[57] ABSTRACT

A regulator assembly for an automatic temperature control system for the passenger compartment of an automotive vehicle. Regulation is by vacuum signal modulated by a sensor responsive to the difference between a selected temperature and the temperature of air in the passenger compartment of the vehicle. A vacuum actuator operated by the modulated vacuum signal is provided for operating an air-blend door for controlling the passage of blower driven heated and cooled air into the passenger compartment. The regulator includes a compact removable vacuum signal modulator subassembly of a bimetal temperature sensing element directly coupled to a vacuum signal modulator valve. Direct feedback of the position of the vacuum actuator to the bimetal sensing element is provided. The modulator is of the type employing balancing of the pressure forces of the vacuum signal against the bias of the bimetal element for positioning the modulator valve. The modulator valve is at equilibrium when the sensed passenger compartment temperature is at the selected value.

18 Claims, 5 Drawing Figures

TEMPERATURE REGULATOR ASSEMBLY AND SIGNAL MODULATOR THEREFOR

BACKGROUND OF THE INVENTION

The present invention relates to improvements in automotive temperature control systems for controlling the temperature in the vehicle passenger compartment. Systems of this type usually employ an air blend door for mixing blower driven heated air from the passenger compartment heater with cooled air from the vehicle air conditioning system in the proper proportions to maintain the passenger compartment at a desired temperature. In such systems the air blend door is typically disposed in ducting supplied by a blower and the blend door is typically operated by a servoactuator powered by a fluid pressure control signal. The control signal is typically generated by a modulator valve, supplied by a source of vacuum on-board the vehicle, and the modulator valve is operated by a temperature sensor which senses the temperature of a flow of air from the vehicle passenger compartment. A control usually located in the vehicle passenger compartment, upon selective positioning, biases the temperature sensor a predetermined amount such that the sensor alters the position of the modulator valve thereby creating a vacuum signal to the actuator and moving the air blend door to increase the amount of heating or coolng of the passenger compartment until the predetermined input to the sensor is neutralized by a corresponding change in the sensed temperature of a flow of passenger compartment air.

Examples of systems operating in this general manner are described in my earlier U.S. Pat. Nos. 3,770,195, 3,774,696, 3,838,841 and 3,983,930; all of which employ regulators utilizing a bimetal actuated temperature sensormodulator valve combination located remotely from the servoactuator for moving the air blend door.

Automatic temperature control systems for the passenger compartment may be arranged to function in any of several desired ways, the most common being of two types, one utilizing the air blend door to mix separate streams of blown air from the air conditioning cooler, or evaporator, and air heated from passage over a heater core operating from engine coolant and in such an arrangement the cooling system or the heater may be operated independently of each other. The second type system requires that the air conditioning system be in operation at all times when the ambient air external to the passenger compartment is above 40° F., whereupon all incoming air to the blower system is first cooled by passage over the air conditioner evaporator and dehumidified; and, the blend door is used to control the amount of cooled dehumidified air which is passed over the heater core and heated before discharge into the passenger compartment.

In the prior automatic temperature control systems utilizing a bimetal temperature sensing element, the bimetal element has been located in an aspirator inlet flow passage, the aspirator receiving ambient air through a nozzle from a blower, which nozzle entrains a flow of in-car air through the aspirator inlet, which entrained flow passes over the bimetal sensing element. This arrangement has necessitated the location of the sensing bimetal some distance from the modulator valve in order to position the bimetal within the aspirator inlet. The remote location of the sensing bimetal from the modulator valve has required intermediate connecting members to transmit the temperature change-induced motion of the bimetal element to the modulator valve. In such prior systems a mechanism has been provided for biasing the bimetal by a predetermined amount by selective movement of the operator's control in the passenger compartment. This arrangement has required that the preload mechanism be associated with the connecting linkages between the bimetal and modulator valve.

In order to calibrate systems arranged in the above-described manner, it has been necessary to assemble the modulator valve, the interconnecting linkages, the sensing bimetal and preload mechanism within the aspirator prior to affecting calibration of the modulator valve-sensor combination, sometimes referred to together as a "sensor." The intermediate linkages employed to transmit motion of the bimetal temperature sensing element to the modulator valve have rendered the assembly and calibration of the sensor combination as costly and difficult procedures during manufacture.

Furthermore, it has long been desirable in designing automotive automatic temperature control systems to provide feedback of the blend door actuator position to the sensor in order to attenuate the effect of large control signal inputs from the operator selective control where a great difference exists between the in-car temperature and the ambient temperature external to the vehicle passenger compartment. Previous systems of the type using a force balance equilibrium between the modulator valve and the temperature sensing element, when the in-car temperature was at the desired level, have not incorporated feedback from the actuator output to the temperature sensor. This has been chiefly due to the remote location of the sensor from the output actuator and, thus, direct mechanical feedback has been virtually impossible.

SUMMARY OF THE INVENTION

The present invention provides a unique regulator for automatic temperature control system for a vehicle passenger compartment in which a temperature sensor is mounted in combination with the output actuator for the air blend door thereby enabling direct mechanical feedback of the actuator positions to the sensor. The temperature sensor includes a bimetal sensing element attached directly to a vacuum modulator valve body which enables the sensor to be assembled as a separate subassembly before installation in an aspirator inlet passage for exposure to an entrained flow of in-car air.

The sensor of the present invention employs a vaned body for the control signal vacuum modulator valve which is received in the aspirator inlet with the bimetal element attached directly to the valve body such that in-car air entrained through the aspirator inlet passes between the vanes for impinging directly on the bimetal sensing element. The modulator valve includes a diaphragm such that the pressure forces of the vacuum signal acting on the diaphragm are balanced against the bias of the bimetal and a preload spring. Movement of the operator control varies the bias causing movement of the modulator valve and change in the vacuum control signal. The changed control signal moves an actuator for altering the position of a temperature controlling air blend door in the system blower ducting. Upon the in-car temperature reaching the selected temperature, the modulator valve is in force balance equilibrium, thereby stabilizing the control signal.

Ambient compensation is provided by a heat exchanger tube disposed in the aspirator inlet upstream of the bimetal with a bypass from the ambient nozzle providing a flow of ambient air to the heat exchanger.

The unique subassembly of the temperature sensing element to the modulator valve enables the sensor subassembly to be precalibrated for vacuum control signal output sensitivity as a function of temperature sensed by the bimetal element, before installation in the aspirator inlet. Upon installation of the precalibrated sensor into the aspirator inlet, a preloading and biasing spring is connected to the bimetal for completing the calibration for operator selected temperature control inputs to the biasing spring. The unique regulator of the present invention has the sensor mounted on a common mount with the output actuator such that actuator motion is in-line with motion of modulator valve, thus permitting connection of direct mechanical feedback of output actuator position to the sensor. Other unique features of the invention will be explained and described more particularly hereinafter with reference to the drawings.

DESCRIPTION OF THE PREFERRED EMBODIMENT

Figure 1:
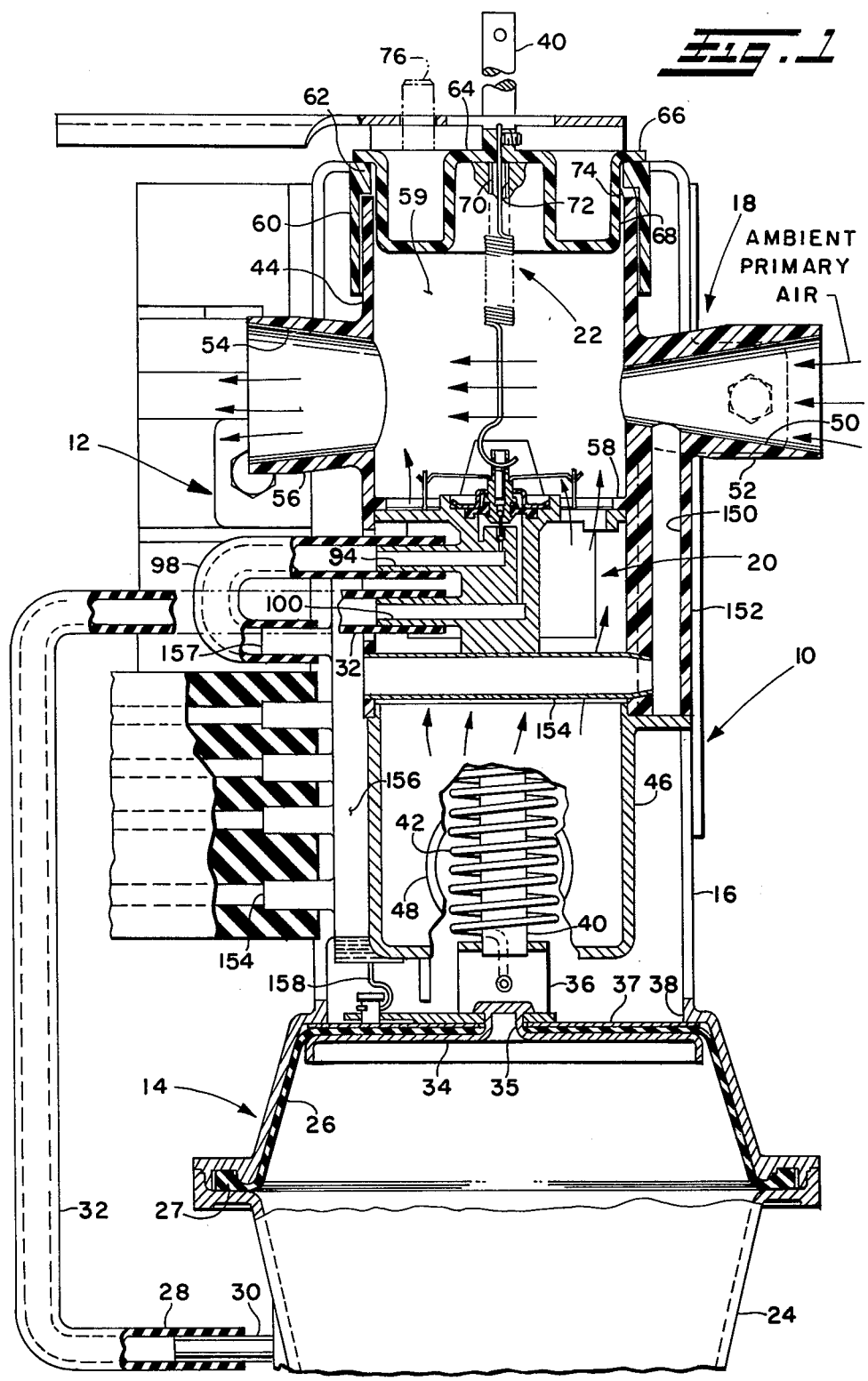
FIG. 1 is a side view of the regulator of the present invention with portions thereof broken away to show the interior arrangement of the actuator, aspirator and sensor interconnection.
Figure 2:
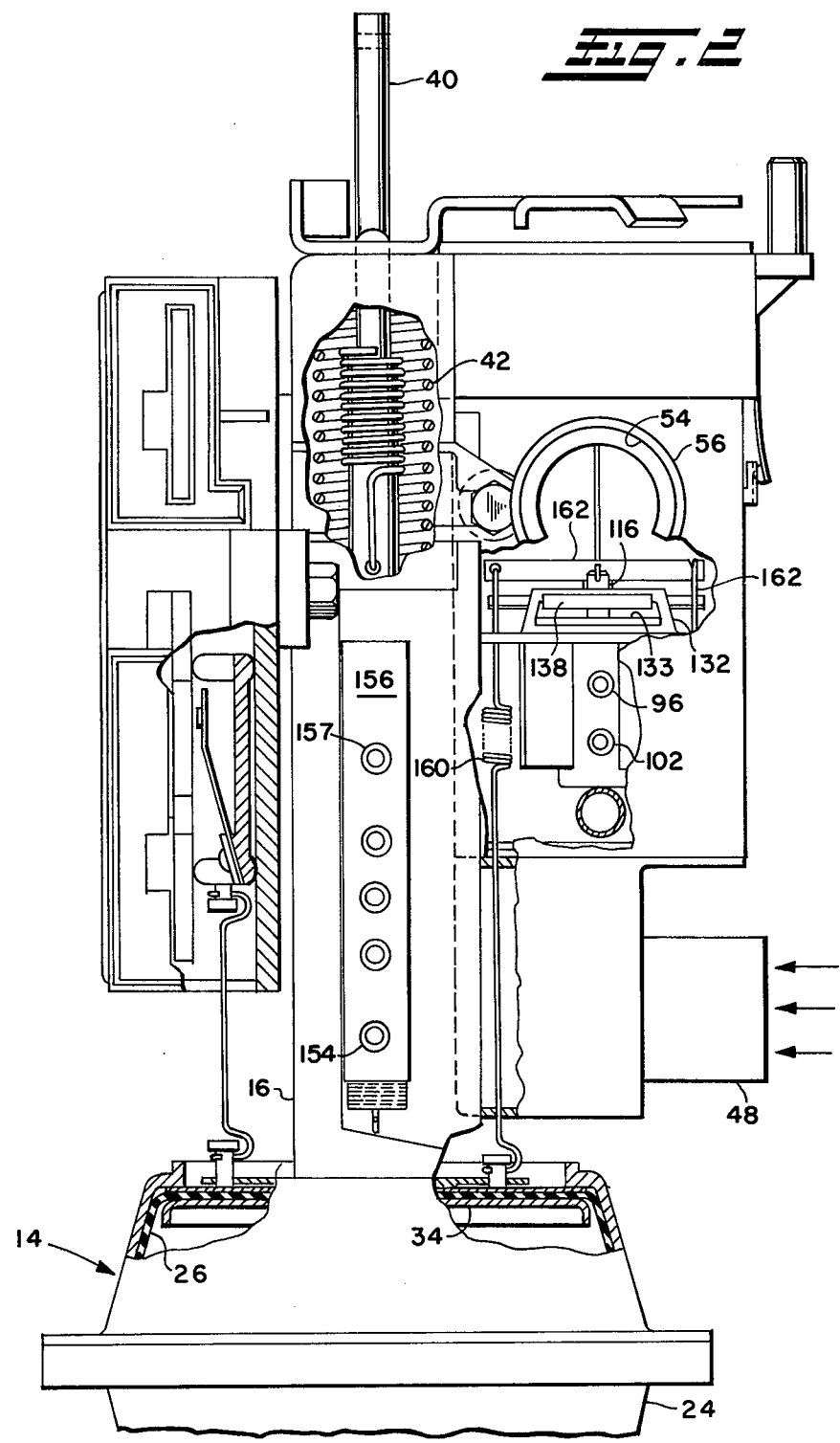
FIG. 2 is a top view of the embodiment of FIG. 1 with portions thereof broken away to show the connection of the feedback spring and linkage.

Referring now to FIGS. 1 and 2 the regulator assembly is indicated generally at 10 and includes a sensor indicated generally at 12, an output actuator indicated generally at 14 which are attached to a common mounting bracket 16. The sensor 12 comprises an aspirator indicated generally at 18, a fluid pressure modulator valve means indicated generally at 20 and an adjustable preload and bias means indicated generally at 22.

The actuator 14 is powered by a fluid pressure signal and comprises a housing 24 preferably formed by two circumferentially joined half shells having a resilient flexible diaphragm 26 disposed within the housing and having a circumferential bead 27 sealed at the parting line of the half shells about the periphery thereof, thereby dividing the housing 24 into two separate pressure chambers. A fluid pressure supply port 28 is provided in the left-hand half shell as shown in FIG. 1 and the port is formed in a nipple 30 extending from the housing half shell, with one end of a vacuum supply hose 32 connected to the nipple 30. The diaphragm 26 has a backing plate 34 provided in the central region thereof, with the plate having a raised portion 35 extending through the diaphragm 34 in sealing engagement and through a cover plate 37 for preferably riveted connection to an attachment bracket 36. The righthand half shell of housing 24 has a clearance aperture 38 provided therein for the bracket 36, and the housing shell is attached to mounting bracket 16 preferably by spot welding.

A force output operating rod 40 is operatively connected to the bracket 36 for connection to the linkage for operating an air blend door (not shown). In the preferred practice of the invention, the rod 40 extends the length of the regulator and beyond the bracket 16 in a righthand direction and has an aperture in the end thereof for connection to the air blend door as illustrated in FIGS. 1 and 2. A power return spring 42 is received over the rod 40 with one end attached to the bracket 36 and the other end of spring 42 anchored in any suitable and convenient manner (not shown) on mounting bracket 16. Spring 42 biases the diaphragm 26 and backing plate 34 in a rightward direction in FIG. 1, thereby urging output rod 40 to the rightward most extreme position, as shown in solid outline in FIGS. 1 and 2, when the actuator 14 is inactive.

The sensor 12 comprises a generally cylindrical tubular housing 44 having an inlet cap 46 received over the aspirator inlet, or left end, in FIG. 1 with the cap having an inlet port 48 extending outwardly therefrom and preferably at generally right angles to the longitudinal direction of the housing 44 as shown in FIG. 2.

Figure 3:
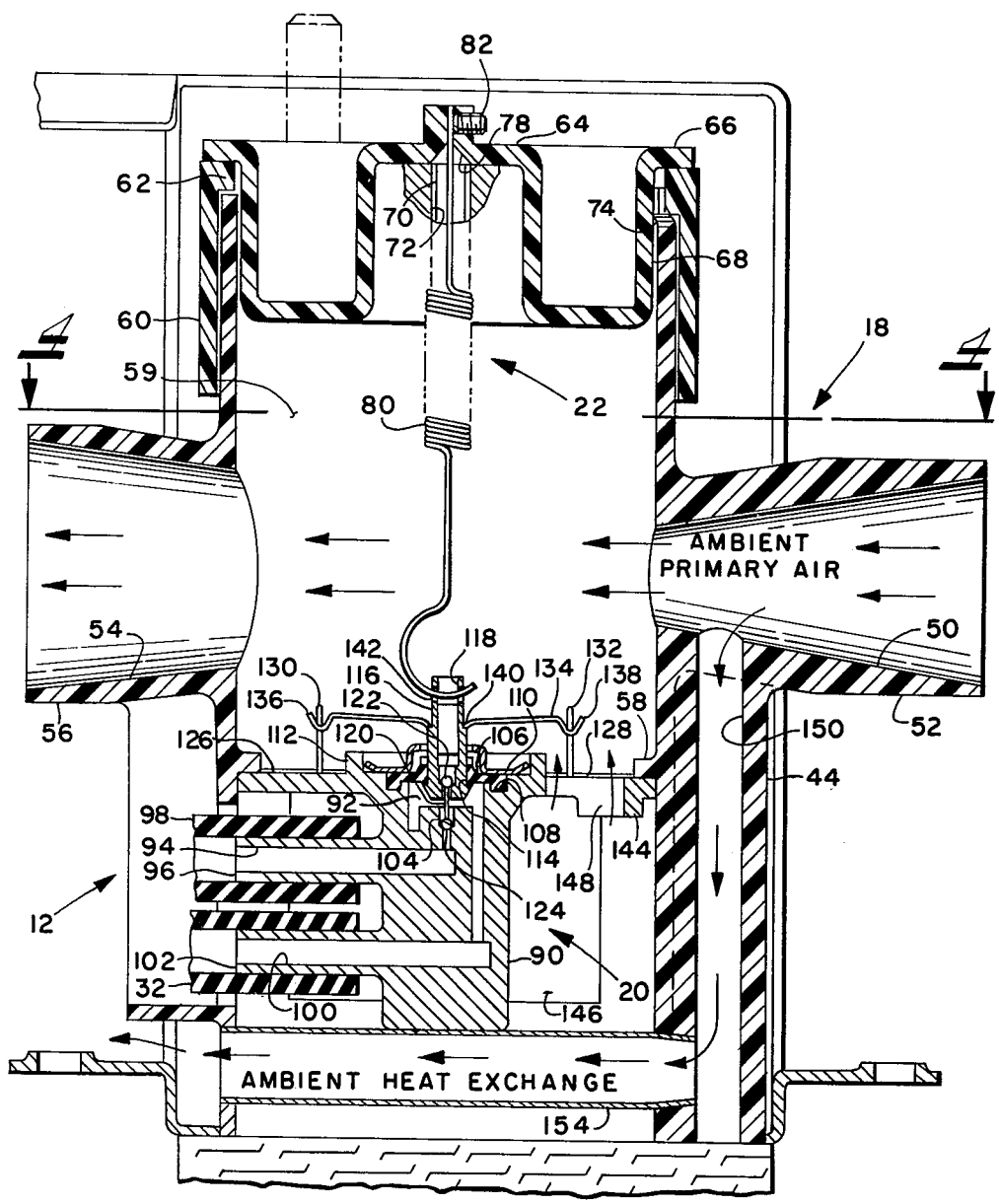
FIG. 3 is an enlarged cross-sectional view of the aspirator and sensor of the embodiment of FIG. 1.

The housing 44 which forms the aspirator 18, has a primary blower air inlet provided therein in the form of a converging nozzle 50 communicating with the interior of the housing 44 as shown in FIGS. 1 and 3 with the flow direction thereof generally at right angles to the axis of the housing 44. The blower air inlet nozzle 50 is formed in a generally tubular projection 52 extending from the outer periphery of the housing 44 at generally right angles thereto and in a downward direction as illustrated in FIG. 1.

A diverging outlet diffuser nozzle 54 also communicates with the interior of housing 44 at a port disposed generally diametrically opposite the inlet nozzle 50, with the direction of the discharge flow thereof aligned with the direction of the flow through the primary inlet nozzle 50. The diverging outlet nozzle 54 is formed in a generally cylindrical projection 56 extending at right angles to the axis of the tubular housing 44.

A circumferential preferably continuous rib 58 is provided around the inner periphery of the aspirator inlet portion of the housing 44, downstream of the inlet port 48 and upstream of the primary air mixing region 59 disposed between nozzles 50 and 54, with the rib extending radially inwardly from the periphery of the housing wall. The inlet side or leftward axial face with reference to FIG. 1, or lower face with reference to FIG. 3, of the rib 58 has a registration and alignment surface for the modulator valve means 20.

The right-hand end with reference to FIG. 1, or upper end with reference to FIG. 3, of housing 44 has received thereover a cam means in the form of a ring 60 rotatable with respect to the housing 44. Ring 60 has a radially inwardly extending flange 62 formed circumferentially about the axial end thereof which flange registers against the right-hand end of the tubular housing 44 for rotational movement with respect thereto. An end cap 64 is received in the end of the housing 44 and has a radially outwardly extending flange 66 which registers against the axially outer or right-hand face in FIG. 1 or top in FIG. 3 of ring flange 62.

Figure 5:
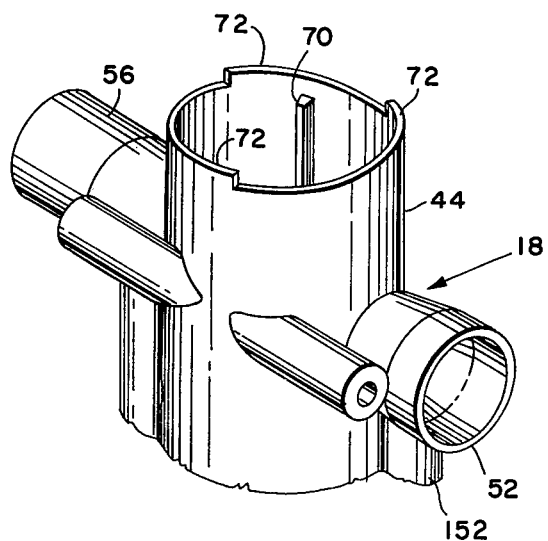
FIG. 5 is a perspective of portions of the aspirator housing showing the details of the operator control input cam for adjusting the preload spring.

With reference to FIGS. 1, 3 and 5, the outer diameter 68 of the main portion of cap 64 is sized so as to be piloted in a slip-fitting arrangement in the inner periphery of housing 44. The end cap 64 is prevented from rotation by a longitudinal rib 70 formed on the inner periphery of housing 44 and extending radially inwardly therefrom. A corresponding longitudinal groove 72 is provided in the outer periphery 68 of the cap 64 for sliding engagement with the rib 70.

Referring particularly to FIG. 5, the end of the housing 44 is shown as having portions thereof defining helical cam surfaces 72 upon which corresponding cam followers 74 provided on the underside of the ring flange 62, as illustrated in FIG. 1, slide upon rotation of the cam ring 60. Cam ring 60 has an attachment post 76 provided thereon as shown in FIG. 1 adapted for attachment thereto by a control input cable for providing rotational movement of the cam ring 60 upon actuation of the control cable (not shown) remotely from the passenger compartment. Rotation of the cam ring 60 causes cam followers 74 to follow the helical contour of cam surfaces 72 and thus produces axial motion of ring 60 which, in turn, causes axial motion of end cap 64.

With reference to FIGS. 1 and 3 the end cap 64 has a central aperture 78 provided therein which has received therethrough one end of a feedback spring 80 retained therein by set screw 82. The opposite end of feedback spring 80 is attached to the modulator valve 20 as will be hereinafter described.

Referring now particularly to FIG. 3, the sensor 12, including the aspirator 18 and the modulator valve 20, is shown in greater detail in an enlarged view of portions of FIG. 1. The modulator valve comprises a body 90 defining a fluid pressure chamber 92 having a fluid pressure supply port 94 communicating therewith and formed in a nipple 96 extending from the body 90 in a horizontal leftward direction in FIG. 3, and which has fluid supply hose 98 connected thereto. The chamber 92 has an outlet port 100 provided therein and communicating exteriorly thereof through a projecting nipple 102 spaced from the supply nipple 96 by an amount sufficient to permit connection of the hose 32 thereto for supplying a fluid pressure signal to the nipple 30 on actuator 14.

A valve seat 104 is defined in the valve body 90 intermediate the end of supply port 94 and chamber 92. The upper wall of chamber 92 with reference to FIG. 3 is formed by a resilient diaphragm 106 having the outer periphery thereof sealed in a groove 108 formed in the body and retained therein by a retaining washer 110 having the outer periphery thereof pressed into a circumferential rib 112 provided on the upper surface of the body 90. The diaphragm 106 has a central aperture 114 provided therein with an actuating member 116 received therein with the periphery of the aperture 114 engaging in sealing contact a groove formed in the outer periphery of the actuating member. Member 116 is a generally elongated cylindrical configuration with an axial bore 118 formed therethrough which bore defines a vent valve seat 120 in the region adjacent the lower end thereof as illustrated in FIG. 3. A movable valve member 120 is received in chamber 92, the valve member having an upper spherical seat surface 122 adapted for contacting the vent seat 118, and a lower spherical valve seat surface 124 adapted for contacting the supply port seat 104. Movement of the actuating member 116 causes movement of the upper and lower seat surfaces 122 and 124 with respect to their corresponding valve seats for controlling flow therethrough to control the pressure in chamber 92. The details of the operation of the valve member 120 are similar to those of the valve set forth in my earlier U.S. Pat. No. 3,831,841 with respect to FIGS. 5 through 7 thereof, and repetition herein is deemed unnecessary.

Figure 4:
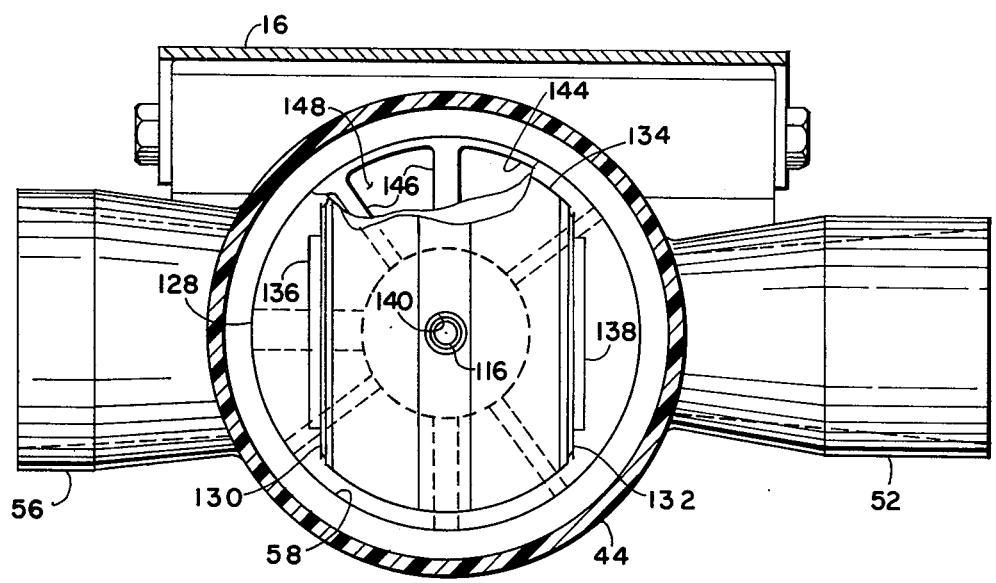
FIG. 4 is a section view taken along section indicating lines 4—4 of FIG. 3 and shows the configuration of the bimetal sensing element.

With reference to FIGS. 1-4, the novel sensor subassembly of the present invention will be described which comprises the temperature sensing element directly attached to and in combination with modulator valve means 20. The upper portion of the valve body 90 defines a substantially flat transverse surface 126 which has the outer periphery thereof received in a slip-fitting manner in the inner periphery of housing 44 through the inlet or lower end thereof in FIG. 3 and the surface 126 is in registration with the axial underface of rib 58. With reference to FIGS. 3 and 4 a thin metal base plate 128 having a central cut-out therein sufficient to clear circumferential rib 112, is received over rib 112 and registers against the upper surface 126 of the valve body. The base plate is retained securely on the surface 126 by any suitable expedient as, for example, plastic deformation of protrusions or lugs provided on the surface 126 of the valve body. The base plate has a pair of upright spaced parallel stanchions 130 and 132 provided thereon, the stanchions each having an elongated slot, respectively 131, 133, one of which is illustrated in FIG. 2, provided therein. With continued reference to FIGS. 3 and 4, a bimetal sensing element in the form of a disc 134 is provided and has a pair of spaced v-notched tab 136, 138 with the tabs respectively each received in one of the slots 131, 133 in the upright stanchions 130, 132. The bimetal element 134 has a central aperture 140 provided therein, with actuator member 116 received therethrough. The actuator member 116 has an aperture 142 received transversely therethrough adjacent the upper end thereof as illustrated in FIG. 3, with the lower end of preload spring 80 received through the transverse aperture 142.

The valve body 90 has the upper surface 126 thereof formed on the face of a radially outwardly extending flange 144 which is supported by a plurality of generally circumferentially equally spaced and radially outwardly extending vanes 146, as illustrated in FIG. 4, in the broken away portion of the bimetal element 134 and metal base plate 128. The spaces intermediate the vanes extend through the flange 144 to provided passageways for aspirated air flowing through the inlet end of the housing 44 as shown by the arrows in FIGS. 1 and 3.

In the presently preferred practice of the invention the sensor subassembly is begun by assembly of the diaphragm 106, valve member 120, actuator 116 and washer 110 which are assembled onto the valve body 90. The base plate 128 and bimetal element are then assembled over the actuator 116 and bimetal element tabs 136 and 138 are received in the slots 131, 133 formed in upright stanchions 130, 132. Upon assembly of the bimetal element to the stanchions 130, 132, the rim of the central aperture 140 in the bimetal element registers against a shoulder formed in the outer periphery of actuator 116, and the actuator is biased in a downward direction in FIG. 3 by the bimetal element 134. Thus, a complete sensor subassembly of the temperature sensing element and vacuum modulator valve means 20 is performed on the valve body 90 prior to assembly of the body into the housing 44. The sensor subassembly may be calibrated prior to installation in housing 44 by connection of a source of fluid pressure through port 94 and the control signal output from chamber 92 through port 100 determined as a function of the temperature experienced by the bimetal sensing element 134. Upon completion of the calibration of the sensor subassembly, the subassembly is inserted through the inlet, or lower end in FIG. 3, of housing 44 such that the upper surface 126 of the valve body registers against the undersurface of rib 58. The lower end of preload spring 80 in FIG. 3 is received through the transverse aperture 142 of the valve actuator 116. Completion of the calibration may then be accomplished by adjustment of the preload on spring 80 by positioning the upper end of spring 80 in the central aperture 78 in the cap 64 and securing the position of the spring end therein with set screw 82. Subsequent rotation of ring cam 60 by the control input from the passenger compartment will vary the axial position of cap 64 and thus alter the length of spring 80 and the preload on the valve actuator 116, thereby providing the desired temperature control setting to the modulator valve 20. As mentioned hereinabove, the functional operation of the bimetal sensing element and modulator valve 20 is described in my earlier U.S. Pat. No. 3,831,841 and further detailed description herein has been omitted for brevity.

Referring now particularly to FIGS. 1 and 3, the housing 44 includes a bypass passage 150 formed in rib 152 which extends downward in FIG. 3 from the nozzle projection 52 and along the side of housing 44. The passage 150 communicates with the primary blower air inlet nozzle 50 and also communicates with an ambient heat exchange tube 154 received transversely across the aspirator inlet at the lower end of housing 144 in FIG. 3 or left end of housing 44 in FIG. 1. Ambient primary air received from a blower (not shown) passes through the tube 154 to effect heat exchange. In-car air is drawn through the aspirator inlet 48 and through the passages 148 to impinge upon bimetal 134 and into mixing region 59 within the housing 44. The relationship of the heat exchange tube to the flow area of the aspirator inlet 48 is chosen to effect the desired amount of ambient compensation to the in-car air drawn into the aspirator inlet.

Referring now particularly to FIGS. 1 and 2, the fluid pressure source, preferably a source of vacuum such as engine manifold vacuum, is applied through a fluid supply port 154 provided in a vacuum programmer 156 mounted on mounting bracket 16 adjacent the aspirator housing 44. The vacuum programmer 156 has a supply outlet port 157 which has one end of the fluid supply hose 98 connected thereto for supplying vacuum to the inlet port 94 of modulator valve means 20. In the presently preferred practice of the invention, the vacuum programmer 156 is a linearly operated valve having an actuator 158 extending therefrom and operatively connected to actuator 14 for movement with the diaphragm plate 34. The vacuum programmer 156 has a plurality of auxiliary ports for providing desired valving of vacuum to associated control devices as, for example, to close the heater water valve or to operate a recirculation door in the air conditioning duct work for recirculation of in-car air for maximum cooling.

Referring particularly to FIG. 2, the feedback means is illustrated as a spring 160 having one end thereof attached to the diaphragm plate 37 of actuator 14 for movement with the diaphragm 26. The remaining end of spring 160 is attached to one end of a pivot bar 162 pivotally mounted on a separate upright stanchion 162 provided on base plate 128. The arm 162 has an attachment intermediate the ends thereof to the actuator 116 of modulator valve 20 and biases the valve actuator 116 in a direction leftward in FIG. 2 and downward with respect to FIG. 3. The movement of the actuator diaphragm 26 in a leftward direction with reference to FIG. 2 increases the feedback preload of spring 160 on the actuator 116, which tends to vent the chamber 90 and decrease the vacuum control signal hose 132 to the actuator 14. Thus the mounting of the sensor 12 such that the motion of the valve 20 is in line with the direction of motion of the diaphragm 26 of actuator 14 enables feedback to be accomplished by a simple tension spring acting directly on a pivot lever for biasing the temperature sensing element.

In the presently preferred practice of the invention, the housing 44 has the nozzle projection 52 and 56 and rib 152 formed integrally therewith. The housing 44, inlet cap 46, cam ring 60, end cap 64 and valve body 90 are preferably formed of a suitable filled plastic material as, for example, nylon filled with glass fibers and sold under the trade name "ZYTEL" and manufactured by E. I. DuPont deNemours Company, Wilmington, Delaware.

The ambient primary air inlet nozzle 50 preferably has a length of 1.1 inches (28 millimeters) and the nozzle has an included angle convergence of 25 degrees, whereas the aspirator discharge nozzle 54 has a length of 0.66 inches (17 millimeters) with an included angle of convergence of about 9 degrees. The inner periphery of the housing 44 having a diameter of 1.5 inches (40 millimeters) has been found satisfactory for use with nozzles of the foregoing dimensions and provides adequate nozzle spacing to provide adequate aspiration into the mixing chamber 59.

With reference to FIGS. 3 and 5, an alternative embodiment of the cam means may be employed having the cam surfaces 72 located on the axial fact of cam ring 60 adjacent the end cap 64, in which case the cam follower would be located on the axial face of the flange 66 adjacent cam ring 60 such that rotation of the cam ring would yield axial movement of cap 64.

In operation, the preload spring 80 is calibrated to balance the bias forces of the bimetal 134 such that the valve member 120 is in equilibrium closing both the vent seat 118 and the vacuum seat 104 at a desired in-car temperature. As ambient primary air is blown through nozzle 50, in-car air is aspirated through aspirator 48 through passages 148 between the valve body vanes 146 for impingement and flow around the bimetal 134 and by heat exchange to the bimetal alters the temperature thereof. The aspirated air then flows past the bimetal for mixing the primary air in mixing region 59 and the mixed air is exhausted through nozzle 54. As the bimetal moves in response to the temperature of the aspirated air, the modulator valve alters the vacuum signal to the actuator 14 for moving the air blend door in the passenger compartment air blower duct work. The temperature within the passenger compartment is thereby altered to the desired temperature. Upon the passenger compartment air reaching the desired temperature, the bimetal sensing element changes the force bias on the modulator valve which then reaches equilibrium and the control signal through port 100 and hose 32 to the actuator is discontinued. The initial position of the bimetal and valve actuator 116 are determined by the operator control input to rotate cam ring 60 and alter the preload on the actuator 116 through preload spring 80. Upon the aspirated in-car air temperature again reaching the desired value the control input preload force on spring 80 is neutralized by temperature induced movement of bimetal 134 thus again neutralizing the modulator valve and the control signal to the actuator 14.

The present invention thus provides a unique regulator assembly having direct mechanical feedback from the actuator to the sensor and having a sensor capable of direct assembly of the modulator valve to the bimetal sensing element to enable precalibration of the sensor prior to assembly of the sensor into the aspirator housing.

Although the preferred form of the invention has been described herein, it will be apparent to those having ordinary skill in the art that the invention is capable of modification and variations and is limited only by the following claims.

What is claimed is:

1. A temperature responsive fluid pressure signal controller usable with vehicular passenger compartment temperature regulators, said controller comprising,
    (a) housing means defining an ambient flow passage for receiving therethrough ambient air external to the vehicle passenger compartment, said housing means further defining an inlet flow passage communicating with said ambient passage, said inlet passage being operable upon flow of ambient air through said ambient flow passage to entrain through said inlet passage in-car air from the vehicle passenger compartment for mixing of ambient and in-car air;
    (b) means defining a fluid pressure chamber;
    (c) means movable in response to changes in pressure within said chamber and including means movable therewith defining a vent port in said chamber;
    (d) means defining a supply port communicating with said chamber and adapted for connection to a source of fluid pressure;
    (e) means defining a signal output port communicating with said chamber and adapted for connection to a fluid pressure actuator;
    (f) signal valve means including means defining a valve seat and a valve member movable with respect to said valve seat and having portions thereof operable to control flow of fluid between said supply port and said chamber, said valve member also being movable with respect to said vent port for controlling venting therethrough;
    (g) temperature responsive means including a bimetal element disposed in said inlet passage in direct contact with said vent defining means and biasing said pressure responsive means in a direction tending to prevent fluid communication between said supply port and said chamber and tending to permit fluid communication through said vent port;
    (h) force bias means including preload means operably connected to said vent port defining means for biasing said vent port defining means in a direction opposing said temperature responsive movement thereof;
    (i) rotary cam means operably connected to said preload means, said cam means including means adapted for attachment thereto, said cam means being rotatable upon connection of said attachment means to a selectively actuatable control for varying the preload of said force bias means; and
    (j) wherein said rotary cam means, said bimetal element, said preload means, and said inlet passage are axially aligned in the direction of movement of said valve member, and wherein, upon rotation of said cam means for any selected setting of said force bias means, said pressure responsive means moves to a position causing said valve member to permit fluid flow between said fluid source and said chamber thereby changing the pressure in said chamber and causing said pressure responsive means to move to a position causing said valve member to block flow through said supply port and wherein the force bias of said bimetal element in response to sensed temperature in said in-flow passage, increases with increasing temperature to overcome the pressure-balanced force of said force bias means and move said vent port and pressure responsive means with respect to said valve member to thereby vent said chamber causing pressure responsive means to yield to the force of said force bias means and thereby moving said vent port with respect to said valve member to block flow through said vent port thereby bringing said pressure responsive means and said bias means in force equilibrium.

2. The controller defined in claim 1 further comprising,
    (a) heat exchange means disposed in said inlet flow passage upstream of said bimetal element and defining a heat exchange passage for flow of fluid therethrough without permitting admixing of such fluid with the flow in said inlet passage, said heat exchange means including a member exposed to the flow in said inlet passage, said member being connected in heat conducting relationship with said heat exchange passage; and
    (b) said housing including means defining a bypass channel communicating flow from said ambient passage to said heat exchange passage, said bypass channel being sized to conduct a minor portion of said ambient flow, wherein said bypass flow conducts heat to and from said heat exchanger to provide ambient temperature compensation of the in-car air entrained in said inlet passage.

3. The device defined in claim 1, wherein said housing means includes a generally cylindrical tubular member defining said inlet passage with said ambient passage defining means comprising a channel intersecting said tubular member at generally right angles thereto and said cam means includes,
    (a) an annular member received over said tubular member and rotatable with respect thereto, said annular member having said attaching means provided thereon.

4. The device defined in claim 1, wherein
    (a) said housing means includes a generally cylindrical tubular member defining said inlet passage and having one end open, the other end closed with said chamber defining means, said valve means and said temperature responsive means disposed.

5. A temperature responsive servoactuator usable with vehicular passenger compartment temperature regulation systems comprising,
    (a) housing means defining an ambient flow passage adapted for receiving therethrough ambient air external to the said passage compartment, said housing means further defining an inlet flow passage communicating with said ambient passage, said inlet passage being operable to entrain in-car air therethrough upon flow of ambient air through said ambient passage;
    (b) temperature responsive means including a bimetal element disposed in said inlet passage, said bimetal element having portions thereof movable with respect to said housing means in response to changes in temperature of said entrained flow past said bimetal;

(c) means defining a fluid pressure signal chamber with a fluid pressure supply port and a fluid pressure signal output port, said chamber defining means including pressure responsive means movable with respect to said port means, said chamber defining means including means defining a vent port, said pressure responsive means being operative to bias said bimetal element in response to changes in the pressure level in said signal chamber upon connection of a source to said supply port;

(d) valve means operatively associated with said pressure responsive means including means movable to control fluid flow between said supply port and said chamber, said movable means also being operative to control fluid flow through said vent port;

(e) means operative to preload and bias said pressure responsive means whereupon the pressure in said chamber acting upon said pressure responsive means causes said pressure responsive means to seek force equilibrium between said pressure and said preload and bias means, and whereupon subsequent changes in fluid temperature in said inlet passage causes said bimetal element to alter said force balance and move said pressure responsive means and effect movement of said valve member for altering fluid flow from said supply port to said chamber and said output port; and (f) said rotary cam means, said bimetal element, said preload means, and said inlet passage are axially aligned in the direction of movement of said valve member, and wherein, upon rotation of said cam means for any selected setting of said force bias means, said pressure responsive means moves to a position causing said valve member to permit fluid flow between said fluid source and said chamber.

6. A temperature responsive servoactuator usable with vehicular passenger compartment temperature regulation systems comprising, (a) housing means defining a primary flow passage adapted for receiving therethrough primary air, said housing means further defining an aspirator inlet flow passage communicating with said primary passage, said aspirator inlet passage being operable to entrain air therethrough upon flow of primary air through said primary passage;

(b) temperature responsive means including a bimetal element disposed in said inlet passage, said bimetal element having portions thereof movable with respect to said housing means in response to changes in temperature of said entrained flow past said bimetal;

(c) means defining a fluid pressure signal chamber with a fluid pressure supply port and a fluid pressure signal output port, said chamber defining means including pressure responsive means movable with respect to said port means, said chamber defining means including means defining a vent port, said pressure responsive means being operative to bias said bimetal element in response to changes in the pressure level in said signal chamber upon connection of a source to said supply port;

(d) valve means operatively associated with said pressure responsive means including means movable to control fluid flow between said supply port and said chamber, said movable means also being operative to control fluid flow through said vent port;

(e) means operative to preload and bias said pressure responsive means whereupon the pressure in said chamber acting upon said pressure responsive means causes said pressure responsive means to seek force equilibrium between said pressure and said preload and bias means, and whereupon subsequent increases in flow temperature in said aspirator inlet passage causes said bimetal element to overcome said force balance and move said pressure responsive means and effect movement of said valve member to increase fluid flow from said supply port to said chamber and decrease flow through said vent port to alter the pressure in said chamber for re-establishing said force equilibrium and subsequent decreases in flow temperature in said inlet passage cause said bimetal element to overcome said force equilibrium and move said pressure responsive means and effect movement of said valve member to decrease flow from said supply port to said chamber and increase flow through said vent port to alter the pressure in said chamber to re-establish said force equilibrium whereupon flow through said vent port and from said supply port to said chamber is blocked;

(f) fluid pressure responsive actuator means operatively connected to said signal port including an output member movable in response to said chamber pressure and adapted for connection to a mechanism to be controlled; and (g) feedback means sensing motion of said output member, said feedback means including,
(i) spring means,
(ii) a pivot bar having one end thereof pivotally connected to said housing means, said pivot bar having an intermediate portion operably connected to said valve means and another end connected to said spring means, wherein said output member is connected to said spring means such that upon movement of said output member said spring means moves said pivot bar for additionally biasing said pressure responsive means.

7. A temperature responsive regulator for use in an air temperature control system having a source of forced air, said regulator comprising:

(a) housing means including means defining
(i) an aspirator inlet passage;
(ii) a primary air inlet port for receiving forced air therein upon connection to said source;
(iii) a mixing region receiving discharge from said primary air inlet, said region communicating with said aspirator air inlet;
(iv) an exhaust port communicating with said mixing region, said exhaust port being spaced downstream from said primary air inlet port in the direction of flow therefrom and aligned therewith to receive discharge directly from said primary inlet port, wherein flow of said primary air through said primary inlet port entrains air flow through said aspirator inlet to said mixing region;

(b) control signal modulator subassembly means received in said aspirator air inlet, said modulator subassembly means capable of being calibrated prior to insertion in said aspirator air inlet, said modulator subassembly including
(i) body means defining a mounting surface and including means defining a fluid pressure signal chamber, said chamber defining means including pressure responsive means movable upon changes in pressure in said chamber, said chamber defining means including means defining a fluid pressure supply port adapted for connection to a source of fluid pressure and means defining a signal output port, said pressure responsive means including means defining a vent port;

(ii) control valve means operatively associated with said vent port defining means, said valve means including a valve member operatively responsive to movement of said pressure responsive means and upon connection of said supply port to a source of pressure, to control flow of fluid through said supply port and through said vent port;

(iii) mounting means operatively connected to said mounting surface;

(iv) temperature responsive means mounted on said mounting means, and including a bimetal element in direct contact with said vent defining means, and operative upon exposure to increased temperatures to bias said pressure responsive means in a direction effecting movement of said valve means to increase communication between said supply port and said chamber and decrease communication through said vent port, said bimetal element being operative upon exposure to increased temperatures to bias said pressure responsive means in a direction effecting movement of said valve means to decrease communication between said supply port and said chamber and increase communication through sad vent port;

(d) preset means received through said housing means and operable upon connection to an operator control and selective movement thereof to bias said valve member to produce a predetermined control signal.

8. The regulator defined in claim 7 wherein said exhaust port is spaced downstream of said primary air inlet port a distance equal to at least four and one-half diameters of said inlet port.

9. The regulator defined in claim 7 wherein said aspirator air inlet is disposed to have the flow therethrough to said mixing chamber generally at right angles to said primary air flow through said inlet port.

10. The regulator defined in claim 7 wherein said inlet port comprises a converging nozzle.

11. The regulator defined in claim 7 wherein said primary air inlet port comprises a converging nozzle having an included angle of about 25 degrees.

12. The regulator defined in claim 7 wherein said primary air inlet port comprises a converging nozzle and said outlet port comprises a diverging nozzle.

13. The regulator defined in claim 7 wherein
(a) said housing means includes a generally tubular member with the interior thereof defining said aspirator inlet at one end thereof and said mixing chamber at the opposite end; and
(b) said preset means includes rotary cam means disposed on said tubular member at the mixing chamber end thereof.

14. The regulator defined in claim 7 wherein
(a) said housing means includes a generally tubular member with the interior thereof defining said aspirator inlet at one end thereof and said mixing chamber at the opposite end; and
(b) said preset means includes an annular member rotatably received over said tubular member adjacent said mixing chamber end thereof, said annular member being operably connected for, upon rotation with respect to said tubular member, effecting movement of said control member in a direction longitudinally of said tubular member.

15. The regulator defined in claim 7 further comprising
(a) means defining a bypass channel communicating with said primary air inlet port upstream of said mixing chamber; and
(b) heat exchange means defining a sealed flow passage therethrough and disposed in said aspirator air inlet and operably connected for flow of primary air from said bypass channel to flow through said sealed flow passage for heat exchange therefrom to said entrained flow in said aspirator air inlet.

16. The regulator defined in claim 7 further comprising feedback means operable in response to movement of said actuator means to bias said control member for effecting alteration of said control signal.

17. The regulator defined in claim 7, further including actuator means operatively responsive to said control signal to perform a control function.

18. A temperature responsive fluid pressure signal generator usable in an air flow passageway, said generator comprising:
(a) body means adapted for mounting in said air flow passageway, said body means including
(i) a mounting surface,
(ii) means defining a fluid pressure signal chamber,
(iii) said chamber defining means including means defining a fluid pressure supply port adapted for connection to a source of fluid pressure and means defining a signal output port,
(iv) means defining a passageway for permitting aspirated air flow through said body means;
(b) control valve means including a valve member operative for movement with respect to one of said ports to control flow of fluid between said supply port and through said signal port;
(c) mounting means operatively connected to said mounting surface, said mounting means including
(i) a base plate having a passageway for permitting air flow therethrough,
(ii) a plurality of spaced supports projecting upwardly from said base; and
(d) temperature responsive means mounted on said supports and disposed in the path of air flow through said passageways, and including a bimetal element having a portion in direct contact with said valve means and operative upon exposure to varying temperatures to bias said valve means in a direction effecting movement of said valve means to increase and decrease communication between said supply port and said chamber to thereby regulate said output signal for a given temperature.

* * * * *